(12) United States Patent
Houle et al.

(10) Patent No.: US 8,433,592 B2
(45) Date of Patent: Apr. 30, 2013

(54) METHOD AND SYSTEM FOR DETERMINING BUFFER INVENTORY SIZE

(75) Inventors: Dale T. Houle, Milford, CT (US); Laurin Eck, Stafford, VA (US)

(73) Assignee: Avraham Y. Goldratt Institute, LP, New Haven, CT (US)

( * ) Notice: Subject to any disclaimer, the term of this patent is extended or adjusted under 35 U.S.C. 154(b) by 1445 days.

(21) Appl. No.: 11/229,234

(22) Filed: Sep. 17, 2005

(65) Prior Publication Data

US 2006/0235734 A1 Oct. 19, 2006

Related U.S. Application Data

(60) Provisional application No. 60/671,543, filed on Apr. 14, 2005.

(51) Int. Cl.
*G06Q 10/00* (2012.01)
*G06Q 20/00* (2012.01)

(52) U.S. Cl.
USPC .............................. 705/7.11; 705/22; 705/28

(58) Field of Classification Search ............... 705/7.11, 705/22, 28
See application file for complete search history.

(56) References Cited

U.S. PATENT DOCUMENTS

| | | | |
|---|---|---|---|
| 5,819,232 A | 10/1998 | Shipman | |
| 5,946,662 A | 8/1999 | Ettl | |
| 5,971,585 A | 10/1999 | Dangart | |
| 6,049,742 A | 4/2000 | Milne | |
| 6,151,582 A * | 11/2000 | Huang et al. | 705/7.25 |
| 6,782,295 B2 | 8/2004 | Martz | |
| 6,836,773 B2 | 12/2004 | Tamayo | |
| 6,885,902 B2 | 4/2005 | Crampton | |
| 6,898,472 B2 | 5/2005 | Crampton | |
| 6,901,304 B2 | 5/2005 | Swan | |
| 7,092,929 B1 * | 8/2006 | Dvorak et al. | 705/28 |
| 7,324,966 B2 * | 1/2008 | Scheer | 705/28 |
| 2003/0061123 A1 | 3/2003 | McMenimen | |
| 2003/0149578 A1 * | 8/2003 | Wong | 705/1 |
| 2003/0216952 A1 * | 11/2003 | Klett et al. | 705/8 |
| 2004/0059649 A1 * | 3/2004 | Sakuma et al. | 705/28 |
| 2004/0230473 A1 * | 11/2004 | Dogan et al. | 705/10 |
| 2004/0230474 A1 * | 11/2004 | Dogan et al. | 705/10 |
| 2004/0230475 A1 * | 11/2004 | Dogan et al. | 705/10 |
| 2005/0071215 A1 | 3/2005 | Armbruster | |

OTHER PUBLICATIONS

Keaton, Mark, "Using the gamma distribution to model demand when lead time", Journal of Business Logistics: 1995.*

* cited by examiner

*Primary Examiner* — Mark A Fleischer
(74) *Attorney, Agent, or Firm* — Raymond A. Nuzzo

(57) ABSTRACT

A method for determining an optimum buffer inventory size by generating a time-based demand pattern that is based on processing discreet demand data through a sliding time window and summing the demand quantity in that time window, and repeating that process as the time window then moves through the time-line of discrete demand, thereby establishing a pattern of cumulative demand in windows-of-time along a time-line. The process moves along the demand time-line from one demand point to the next demand point, summing up all of the demand in a window of time that corresponds to the Time-to-Reliably Replenish (TRR). The method plots each summation of demand for its corresponding window of time (TRR) on a time-line at a point in time coinciding with the first demand data element in each summation. The resulting buffer size is based on the conversion of discrete demand data into time-based demand patterns.

3 Claims, 10 Drawing Sheets

| Requisition # | S/N | TRR | Order Date | Completion Date | Quantity | Status |
|---|---|---|---|---|---|---|
| 23456 | 0001 | 1 | 1/3/2002 | 1/4/2002 | 1 | Complete |
| 23457 | 0002 | 2 | 1/3/2002 | 1/5/2002 | 1 | Complete |
| 23458 | 0003 | 1 | 1/4/2002 | 1/5/2002 | 1 | Complete |
| 23459 | 0004 | 4 | 1/5/2002 | 1/9/2002 | 1 | Complete |
| 23460 | 0005 | 6 | 1/6/2002 | 1/12/2002 | 1 | Complete |
| 23461 | 0006 | 18 | 1/7/2002 | 1/25/2002 | 1 | Complete |
| 23462 | 0007 | 3 | 1/8/2002 | 1/11/2002 | 1 | Complete |
| 23463 | 0008 | 3 | 1/9/2002 | 1/12/2002 | 1 | Complete |
| 23464 | 0009 | 12 | 1/10/2002 | 1/22/2002 | 1 | Complete |
| 23465 | 0010 | 2 | 1/11/2002 | 1/13/2002 | 1 | Complete |
| 23466 | 0011 | 3 | 1/11/2002 | 1/14/2002 | 1 | Complete |
| 23467 | 0012 | 21 | 1/12/2002 | 2/2/2002 | 1 | Complete |
| 23468 | 0013 | 4 | 1/13/2002 | 1/17/2002 | 1 | Complete |
| 23469 | 0014 | 2 | 1/14/2002 | 1/16/2002 | 1 | Complete |
| 23470 | 0015 | 10 | 1/15/2002 | 1/25/2002 | 1 | Complete |
| 23471 | 0016 | 8 | 1/16/2002 | 1/24/2002 | 1 | Complete |
| 23472 | 0017 | 5 | 1/17/2002 | 1/22/2002 | 1 | Complete |
| 23474 | 0018 | 4 | 1/18/2002 | 1/22/2002 | 1 | Complete |
| ...... | ..... | ..... | ..... | ..... | ..... | ..... |
| ...... | ..... | ..... | ..... | ..... | ..... | ..... |
| ...... | ..... | ..... | ..... | ..... | ..... | ..... |
| 35001 | 0120 | 3 | 06/1/2002 | 06/4/2002 | 1 | Complete |
| 35002 | 0121 | 2 | 06/2/2002 | 06/4/2002 | 1 | Complete |
| 35003 | 0122 | 2 | 06/3/2002 | 06/5/2002 | 1 | Complete |
| 35004 | 0123 | 4 | 06/4/2002 | 06/8/2002 | 1 | Complete |
| 35005 | 0124 | 5 | 06/5/2002 | 06/10/2002 | 1 | Complete |
| 35006 | 0125 | 6 | 06/6/2002 | 06/12/2002 | 1 | Complete |
| ..... | ..... | ..... | ..... | ..... | ..... | ..... |
| ..... | ..... | ..... | ..... | ..... | ..... | ..... |
| ..... | ..... | ..... | ..... | ..... | ..... | ..... |
| ..... | ..... | ..... | ..... | ..... | ..... | ..... |
| ..... | ..... | ..... | ..... | ..... | ..... | ..... |
| 45001 | 0800 | 3 | 12/1/2002 | 12/4/2002 | 1 | Complete |
| 45001 | 0801 | 14 | 12/2/2002 | 12/16/2002 | 1 | Complete |
| 45003 | 0802 | 8 | 12/3/2002 | 12/11/2002 | 1 | Complete |
| 45004 | 0803 | 6 | 12/4/2002 | 12/10/2002 | 1 | Complete |
| 45005 | 0804 | 6 | 12/5/2002 | 12/11/2002 | 1 | Complete |
| 45006 | 0805 | 5 | 12/6/2002 | 12/11/2002 | 1 | Complete |

FIG.3

METHOD AND SYSTEM FOR DETERMINING BUFFER INVENTORY SIZE

CROSS-REFERENCE TO RELATED APPLICATIONS

This application claims the benefit of commonly owned U.S. provisional application No. 60/671,543, filed Apr. 14, 2005, the entire disclosure of which is incorporated herein by reference.

BACKGROUND OF THE INVENTION

1. Field of the Invention

The present invention generally relates to a method and system for determining appropriate buffer inventory for items associated with variable demand patterns.

2. Description of the Related Art

Typically, there are many problems experienced by supply/logistics chains from the point of use back through the source of supply. These problems include:
 a) too many "not in stock" situations;
 b) maintenance and/or repair personnel frequently "cannibalize" assets and inventory from other projects in order to meet a deadline;
 c) workload priorities are constantly shifted;
 d) lead times to repair and/or replenish-to-shelf are too long;
 e) too much inventory is "in-work";
 f) expeditious repairs are routine;
 g) inventory turnover of consumables and repairable items are too low;
 h) too much of some inventories and not enough of other inventories;
 i) unpredictability and/or variation in demand;
 j) significant manpower is spent maintaining, preserving, inventorying, and stockpiling material;
 k) negative effects on morale resulting from non-value added activities; and
 l) frequent disagreements between supply and consumers over the types and quantities of inventories to stock and where to locate such inventories.

What is needed is a new method and system for accurately determining an appropriate buffer inventory that solves and/or eliminates the aforesaid problems and deficiencies of supply and logistic chains.

SUMMARY OF THE INVENTION

In one aspect, the present invention is directed to a method for determining buffer inventory comprising the steps of selecting an item for which demand data is to be reviewed, identifying all information associated with the selected item, filtering the information based on pre-selected filter settings to provide filtered demand data, and displaying the filtered demand data. The method further comprises processing the filtered demand data to determine the longest period of time to complete a requisition, determining an optimum TRR (Time To Reliably Replenish) that is sufficient to allow a predetermined percentage of requisitions to be completed, generating on a display device a representation of dispersion of replenishment time TRR for the selected item and indicating in the representation the determined optimum TRR, and providing a user with the opportunity to vary the optimum TRR to provide an adjusted TRR so as to compensate for process changes, unforeseen circumstances or infrequent demand spikes. The method further includes processing the filtered data to determine the date of the oldest requisition for the selected item and designating this determined date as the initial starting point, defining a predetermined time window equal to either the adjusted TRR if the optimum TRR has been adjusted or the optimum TRR if the optimum TRR has not been adjusted, processing the filtered demand data within the predetermined time window starting from the initial starting point to determine the accumulated demand for the selected item during that particular predetermined time window, and storing the determined accumulated demand. The method further comprises incrementing the initial starting point to provide an updated starting point, processing the filtered demand data within the predetermined time window starting from the updated starting point to determine the accumulated demand for the selected item during that particular predetermined time window, and storing the determined accumulated demand. The incrementing and subsequent processing and storing steps are repeated until the end of the filtered demand data has been reached. The method further comprises processing all stored determined accumulated demands to determine the numerically highest accumulated demand, displaying on a display device the determined numerically highest accumulated demand value, and generating on a display device a representation of the demand pattern for the selected item based on the series of determined accumulated demands. The method further includes the steps of setting a buffer inventory size to have a value equal to the determined numerically highest accumulated demand value, determining the impact of the initial buffer inventory size on meeting demand for the selected item, and providing the user with an opportunity to adjust the initial buffer inventory size to provide an adjusted buffer inventory size.

In a related aspect, the present invention is directed to a computer program for performing a method for determining buffer inventory size in an electronic data processing system, comprising:
 a computer readable medium;
 computer program instructions, recorded on the computer readable medium, executed by a processor, for performing the steps of:
 (a) selecting an item for which demand data is to be reviewed;
 (b) identifying all information associated with the selected item;
 (c) filtering the information based on pre-selected filter settings to provide filtered demand data;
 (d) displaying the filtered demand data;
 (e) processing the filtered demand data to determine the longest period of time to complete a requisition;
 (f) determining an optimum TRR that is sufficient to allow a predetermined percentage of requisitions to be completed;
 (g) generating on a display device a representation of dispersion of replenishment time TRR for the selected item and indicating in the representation the determined optimum TRR;
 (h) providing a user with the opportunity to vary the optimum TRR to provide an adjusted TRR so as to compensate for process changes, unforeseen circumstances or infrequent demand spikes;
 (i) processing the filtered data to determine the date of the oldest requisition for the selected item and designating this determined date as the initial starting point;
 (j) defining a predetermined time window equal to either the adjusted TRR if the optimum TRR has been adjusted or the optimum TRR if the optimum TRR has not been adjusted;

(k) processing the filtered demand data within the predetermined time window starting from the initial starting point to determine the accumulated demand for the selected item during that particular predetermined time window;
(l) storing the determined accumulated demand;
(m) incrementing the initial starting point to provide an updated starting point;
(n) processing the filtered demand data within the predetermined time window starting from the updated starting point to determine the accumulated demand for the selected item during that particular predetermined time window;
(o) storing the determined accumulated demand;
(p) repeating steps (m), (n) and (o) until the end of the filtered demand data has been reached;
(q) processing all stored determined accumulated demands to determine the numerically highest accumulated demand;
(r) displaying on a display device the determined numerically highest accumulated demand value;
(s) generating on a display device a representation of the demand pattern for the selected item based on the series of determined accumulated demands determined in steps (k)-(p);
(t) setting an initial buffer inventory size to have a value equal to the determined numerically highest accumulated demand value;
(u) determining the impact of the initial buffer inventory size on meeting demand for the selected item; and
(v) providing the user with an opportunity to adjust the initial buffer inventory size to provide an adjusted buffer inventory size.

Other objects, features and advantages of the present invention will be apparent from the ensuing description.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which:

FIG. 3 is an exemplary table of demand data for a particular item;

DESCRIPTION OF THE PREFERRED EMBODIMENTS

The ensuing description makes reference to FIGS. 1-8 of the drawings. The graphs and/or tables shown in FIGS. 3-8 are exemplary and are presented to facilitate understanding of the invention.

Figure 1:
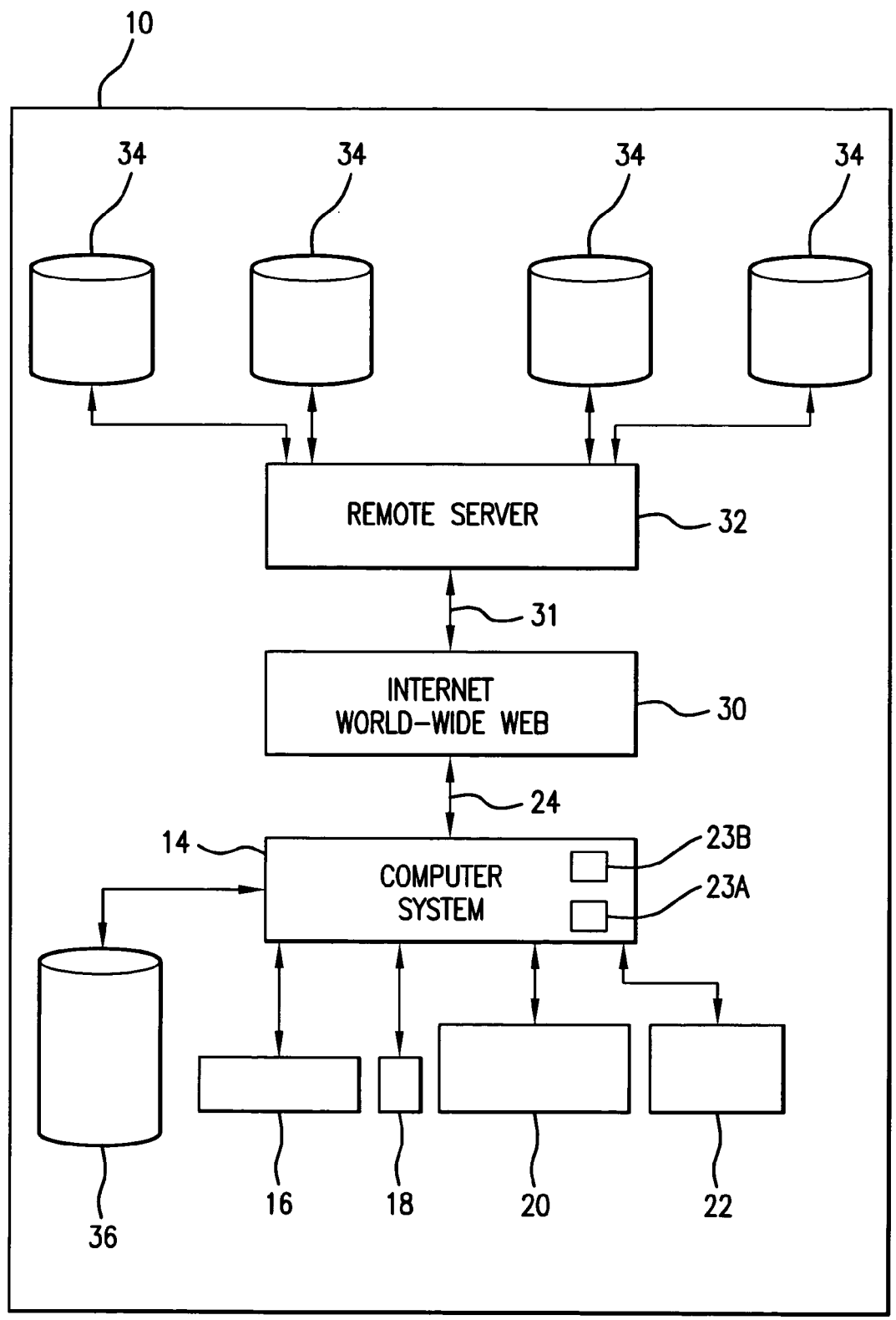
FIG. 1 is a block diagram of a computer network, in accordance with one embodiment of the invention, with which the method of the present invention can be implemented.

Referring to FIG. 1, there is shown network 10 that can be used to implement the method of the present invention. Network 10 comprises an end user computer system 14 having input devices such as keyboard 16, mouse 18, display device 20 and printing device 22. Computer system 14 can be configured as a personal computer, workstation, server system, and minicomputer or mainframe computer. Computer system 14 includes processor or CPU 23A and memory 23B. Processor 23A executes program instructions in order to carry out the functions of the present invention. The processor of computer system 14 is a microprocessor, such as an Intel Pentium® processor, but may also be a minicomputer or mainframe computer processor. Memory 23B stores program instructions that are executed by processor 23A. Memory 23B also stores data that is used and processed by processor 23A. Memory 23B may include electronic memory devices, such as random-access memory (RAM), read-only memory (ROM), programmable read-only memory (PROM), electrically erasable programmable read-only memory (EEPROM), flash memory, etc. and electromechanical memory, such as magnetic disk drives, tape drives, optical disk drives, etc. which may use an integrated drive electronics (IDE) interface, or enhanced IDE (EIDE), or ultra direct memory access (UDMA), or a small computer system interface (SCSI) based interface, or fast-SCSI, or wide SCSI, or fast and wide SCSI, etc., or a fiber channel-arbitrated loop (FC-AL) interface.

Computer system 14 also includes input/output interfaces, and network adapters. Display device 20 can be configured as a CRT or LCD monitor.

Computer system 14 is in electronic data communication with data link 24. Data link 24 can be configured as any type of medium capable of transmission of data signals. Thus, data link 24 can be configured as a dedicated land line, phone lines, broadband cable, etc. Data link 24 can also be configured as a wireless system such as a satellite uplink and down link system. Data link 24 is in data communication with internet or world-wide-web 30. Network 10 includes data link 31 which is in data communication with internet 30. Data link 31 can have the same configuration as data link 24. Network 10 further includes remote server 32 that is in data communication with internet 30 via data link 31. Although one server 32 is shown, it is to be understood that more than one server can be utilized. Network 10 further includes data bases 34. Each data base 34 contains data relating to the demand requirements of parts, components or items that are used by the end user. Such data includes requisition data such as the date an order is placed and completed, the time for the requisition to be completed (TRR) to the consumer if a part is issued from other than the shelf (a Not-In-Stock-Situation), or the time for the shelf to be replenished if the part was issued from the shelf, component or part serial number, and project code. The data bases 34 may include other data as well such as repair and/or maintenance history of all parts or components. As used herein, the terms "parts", "components", and "products" are used interchangeably and are collectively referred to herein as "item" or "items". Network 10 may also include data base 36 which is located on the same premises as computer system 14. Data base 36 may be configured to store the same data stored in data bases 34 and/or store any resulting analysis and data generated by the implementation of the method of the present invention on computer system 14.

Figure 2A:
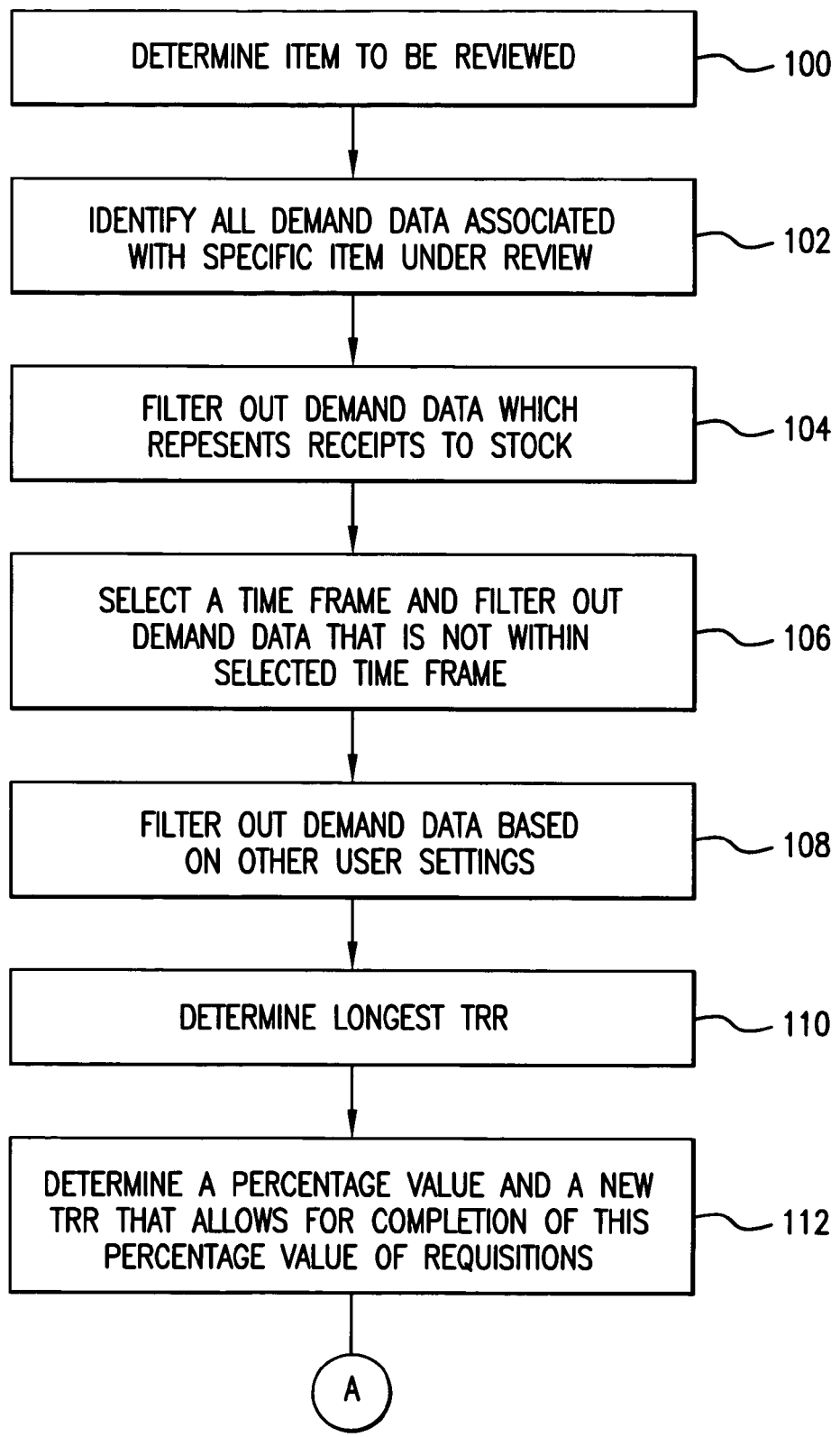
FIGS. 2A, 2B and 2C are flow diagrams of the method of the present invention.
Figure 2B:
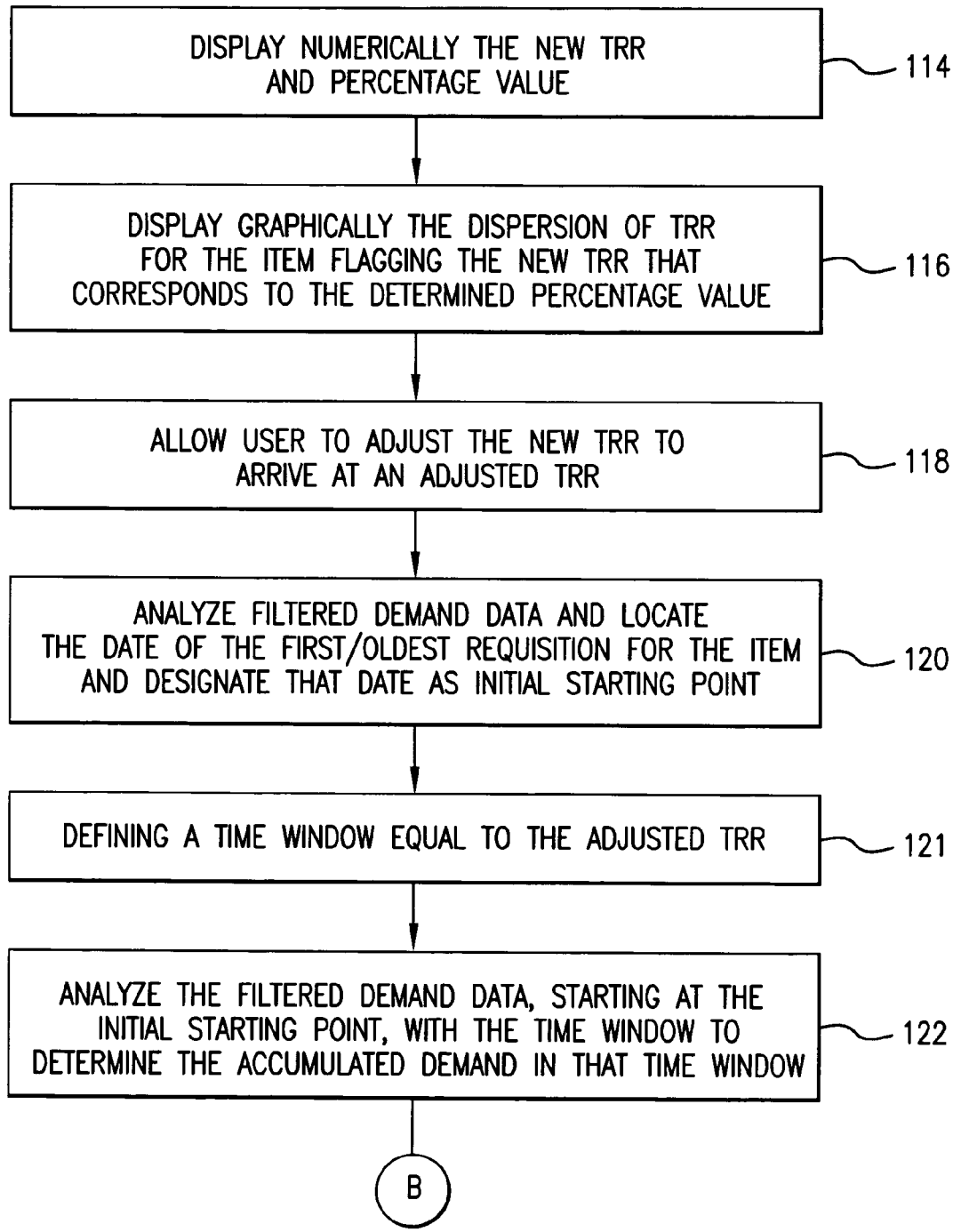
Figure 2C:
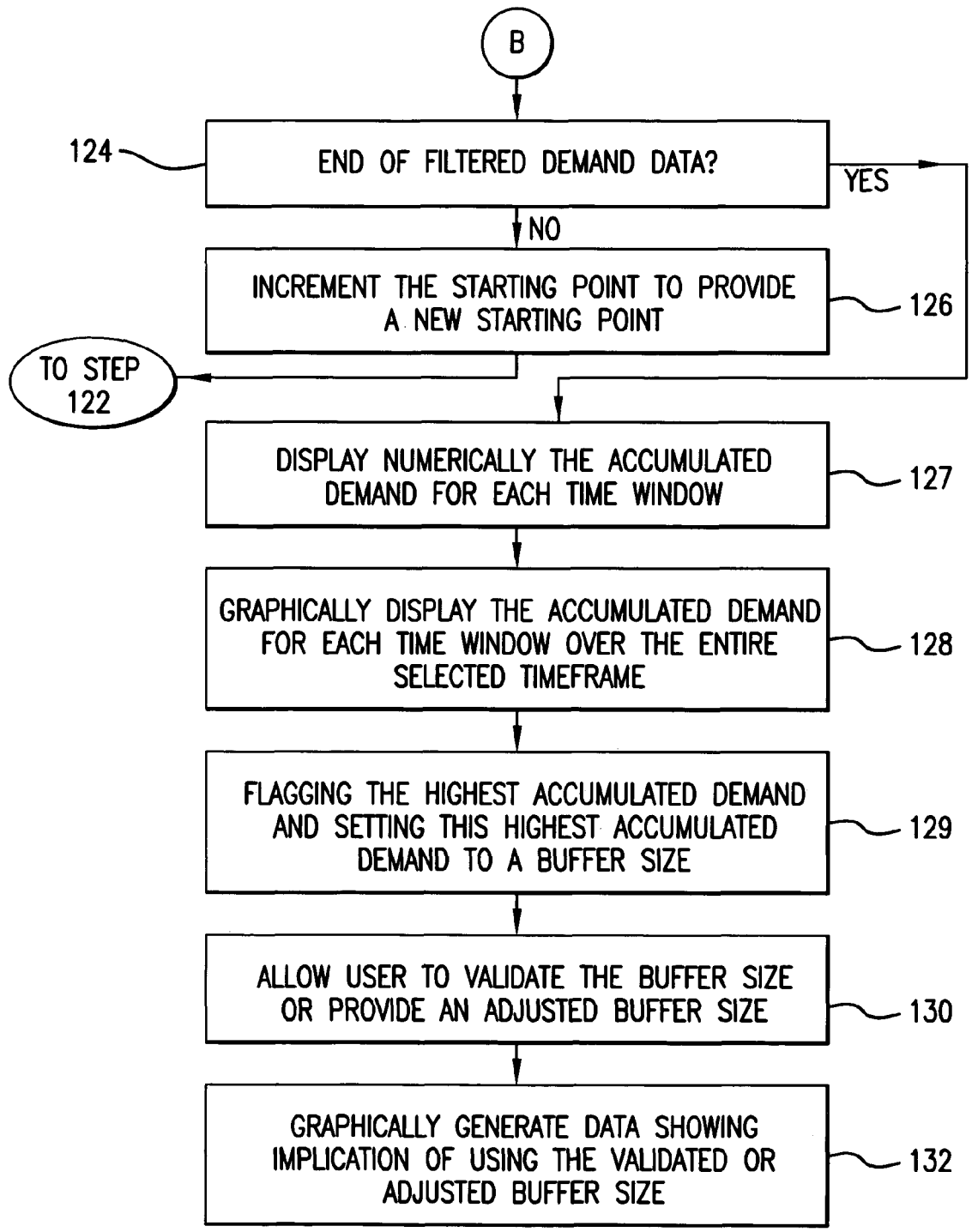

Referring to FIG. 2, the first step of the method of the present invention, step 100, entails determining, selecting or specifying the item for which demand data is to be reviewed. The term "demand data" as used herein refers to all data that pertains to requisitions for the selected item between the supplier and the consumer. Typically, an item for which demand data is to be reviewed is an item subject to variable demand patterns and/or problems in establishing a reliable and/or desirable time-to-reliably-replenish (TRR). The user inputs data representing the selected item into computer system 14 via keyboard 16 and/or mouse 18.

Next, in step 102, the user performs a search of data bases 34 or data base 36 for all detailed information associated with the selected item.

In step 104, the user inputs desired filter settings into computer system 14. In response, computer system 14 processes the demand data for the item in question and filters out demand data based on the user's filter settings. Specifically, this step segregates demand for stock replenishment actions from the demands made from stock on the wholesale, retail level or local repair process.

In step 106, the user inputs a specified time frame for which demand data is sought. In response to the inputted time frame, computer system 14 then filters out all demand data that is not within the specified time frame.

In step 108, the user inputs other criteria that are used by computer system 14 to filter out other data that is not desired. For example, the user may input specific data representing Project Codes, Type Equipment Code, Work Centers, UIC, etc. for which demand data-is not desired.

Figure 4:
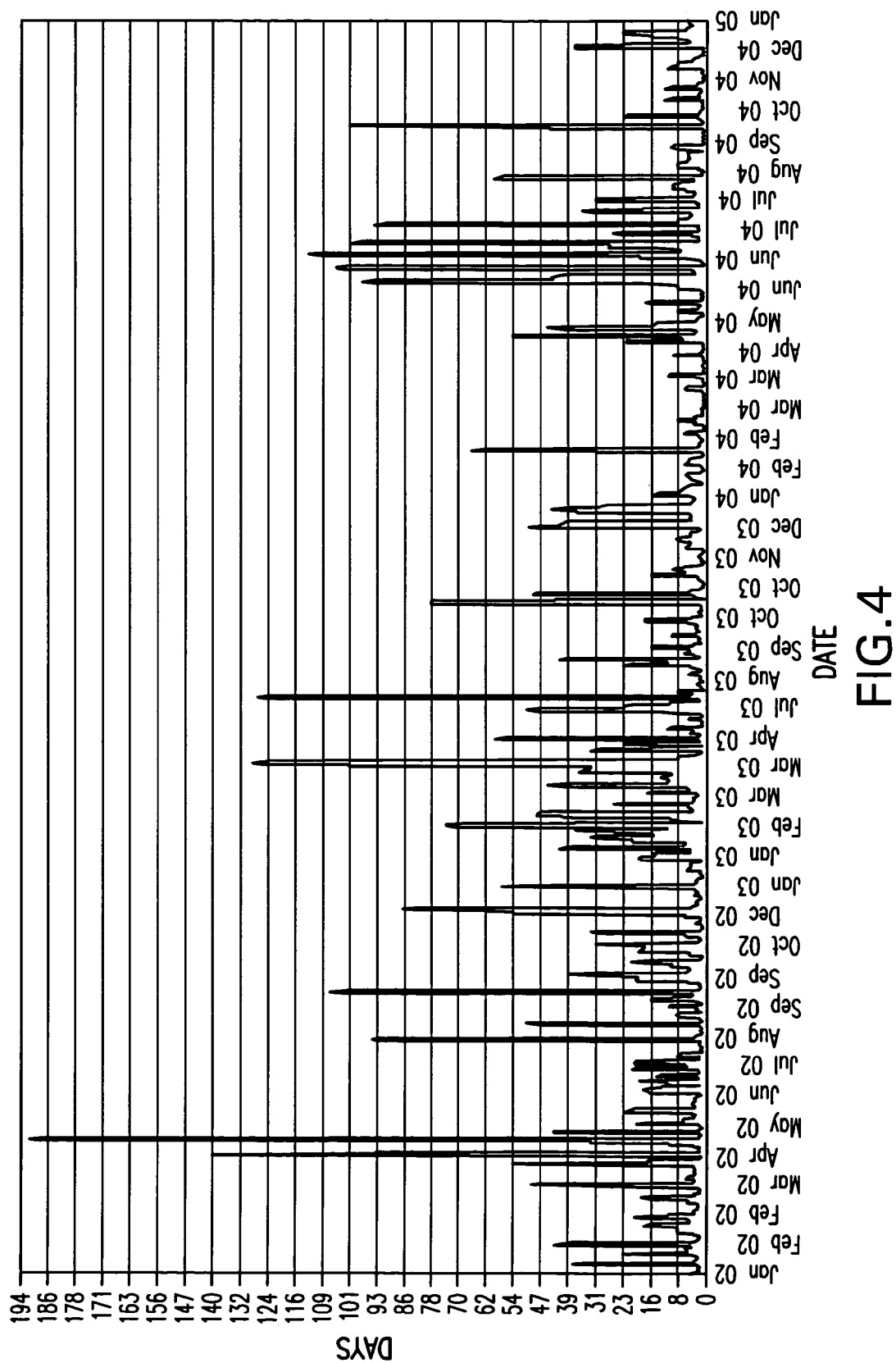
FIG. 4 is an exemplary graph of a TRR (Time-To-Reliably-Replenish) trend for a particular item.

As a result of the data processing implemented by steps 106 and 108, the filtered demand data is presented on display device 20. In one embodiment, the filtered demand data is presented in tabular form as shown in FIG. 3. The exemplary table shown in FIG. 3 includes data and information related to "Requisition #", the serial no. "S/N", "TRR", "Order Date", "Completion Date", "Quantity" and "Status". Thus, for example, on Jan. 3, 2002, requisition no. 23456 was placed for the item. The quantity of item ordered was one. The serial no. of the item delivered is 0001. The time-to-replenish (TRR) is one day. Thus, the ordered item arrived on the first day after the requisitioned was made. In a preferred embodiment, step 108 also allows the user to prompt computer system 14 to effect generation of a graph on display device 20 that shows the TRR trend for the particular item. An example of such a graph showing a TRR trend is shown in FIG. 4. The horizontal axis is a time line and the vertical axis is the amount of time from the requisition order date to the date on which the requisition is completed. The TRR trend shown in FIG. 4 is exemplary and is not based on demand data shown in FIG. 3.

Next, in step 110, computer system 14 processes all of the filtered demand data to determine the longest period of time required to complete a requisition. Stated another way, step 110 determines the longest TRR. Using the demand data shown in FIG. 3 as an example, step 110 processes this demand data to determine the longest TRR. Step 110 may also be illustrated by Example 1:

EXAMPLE 1

In this example, twelve months of demand data for a particular item is under evaluation. The longest amount of time needed to complete a requisition was eleven days. Although eleven days was the longest period of time to complete a requisition, the vast majority of requisitions were completed in seven days or less and a few of the requisitions were completed between eight and ten days, inclusive. Therefore, step 110 would identify eleven days as the longest period of time to complete a requisition.

Next, in step 112, the user analyzes the filtered demand data, which may be presented in the form shown in FIGS. 3 and 4, in order to determine a particular, optimum TRR that is sufficient to allow a predetermined percentage of requisitions to be completed. For example, when using the scenario described in Example 1, an analysis of the demand data reveals that although eleven days was the longest period of time to complete a requisition, the vast majority of requisitions were completed in seven days or less with a few of the requisitions being completed between eight and ten days, inclusive. Thus, a user could ascertain from the data that the eleven day period in question was the exception and that the requisitions having completion times between eight and ten days, inclusive, occurred early in the sample period, i.e. early in the twelve month period under evaluation. Furthermore, the user may determine that the eleven-day requisition time may be a non-recurring "demand spike" which does not require coverage with a corresponding buffer inventory size. Thus, the user may conclude that the optimum TRR does not have to cover one-hundred percent of the requisitions. Instead, the user may find that only a percentage, e.g. 80%, 90%, etc. of the requisitions need to be covered by an optimum TRR. Thus, the user then determines a percentage that would exclude the TRRs that are considered exceptions, anomalies, or occurring early in the sample period. Thus, in the present example, the user determines that an optimum TRR need only cover 85% of all requisitions and that a TRR of seven days corresponds to this percentage value of 85%.

In step 112, the user inputs the determined percentage value into computer system 14. In step 114, the computer system 14 displays the determined percentage and TRR values. Thus, using the aforesaid example, computer system 14 displays the determined percentage value 85% and a TRR of seven days.

Figure 5:
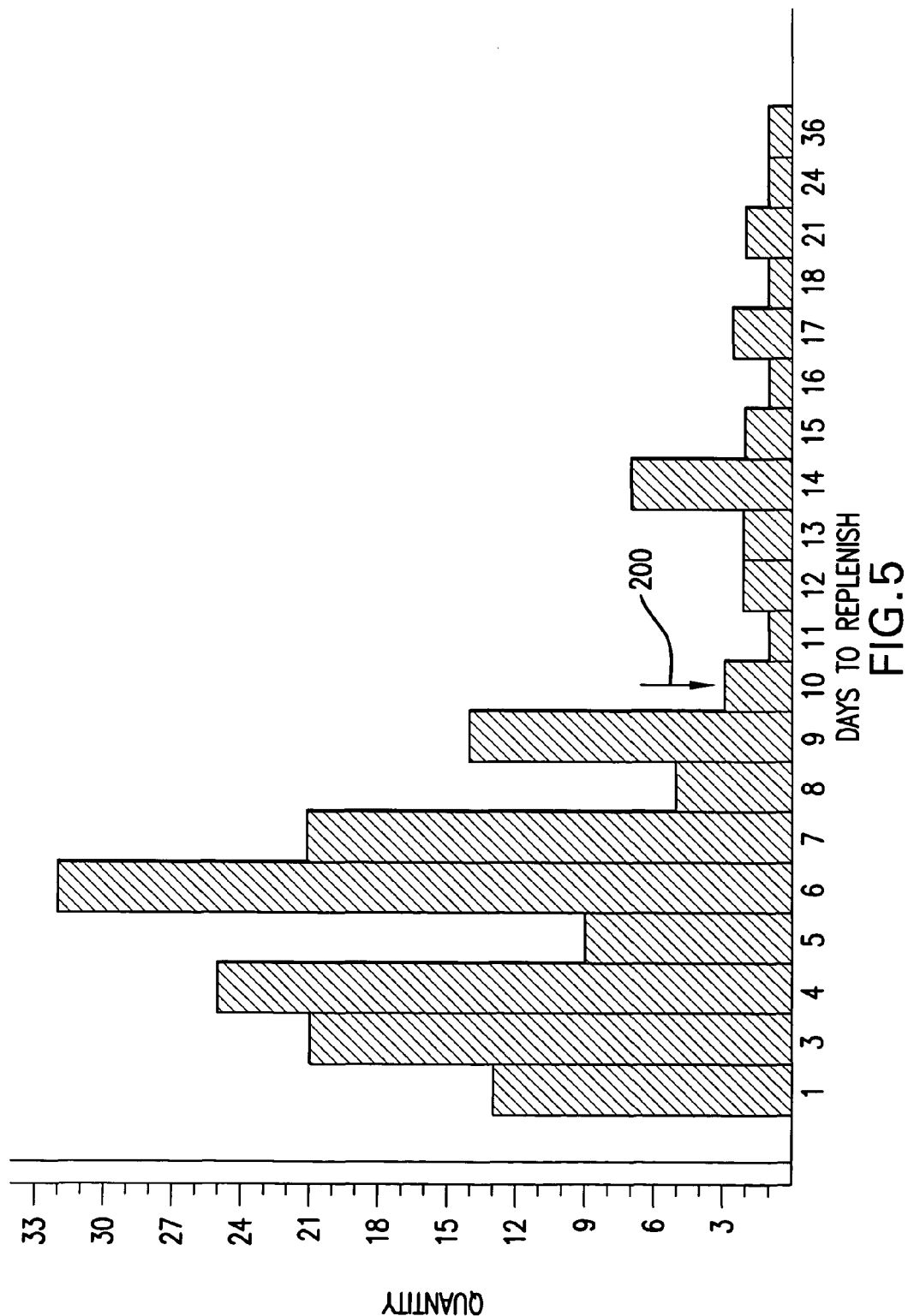
FIG. 5 is an exemplary graph of the dispersion of replenishment time and accumulated quantity for a particular item.

In step 116, computer system 14 displays on display device 20 a graphic representation of the dispersion of replenishment time (TRR) for the selected item wherein the optimum TRR determined in step 112 is flagged for identification. This step is illustrated by FIG. 5 and Example II:

EXAMPLE II

In this example, the selected or determined percentage cutoff value is 85% and the TRR corresponding to this percentage is ten days. Next, computer system 14 generates a graphic representation of the dispersion of replenishment time (TRR) for the selected item. FIG. 5 shows this graphic representation. The vertical axis, QUANTITY, represents the quantity of items for which requisitions were made. The horizontal axis, DAYS TO REPLENISH, represents the number of days needed for the requisitioned or demanded quantity to arrive. For example, a review of FIG. 5 reveals that thirteen items arrived within one day of the date the requisition was made. Twenty-one items arrived within three days of the date requisition was placed. Thirty-two items arrived within six days of the date the requisition was placed. Three items arrived within ten days after the date the requisition was placed. Since ten days is also the optimum TRR, a flag 200 is shown indicating ten days as the TRR that corresponds to the percentage value of 85%. Thus, as a result of viewing the graphical representation of FIG. 5, the user can see that a vast majority of requisitioned or demanded items arrived in ten days or less while there were relatively few instances wherein requisitioned or demanded items arrived more than ten days after the requisition was made.

After review of the graph of the dispersion of replenishment, step 118 provides the user with an opportunity to change or adjust the optimum TRR number determined in the previous steps in order to compensate for process changes, unforeseen, unusual or infrequent circumstances, or infrequent demand spikes. For example, as shown in FIG. 5, the user may conclude that the instances wherein items arrived more than ten days after the requisitions were the result of unusual supply system break-downs, unforeseen circumstances, or possibly one-time demand spikes. Process changes may also affect the TRRs. Such process changes may result in increased or decreased TRRs at different points in the entire time frame being analyzed. Thus, step 118 allows the user to either leave the optimum TRR unchanged or adjust optimum TRR.

Next, in step 120, the user inputs commands into computer system 14 to locate the date of the first requisition for the item. Typically, this would be the oldest requisition. The date of the first requisition is designated as the initial starting point. For example, using the data shown in FIG. 3, Jan. 3, 2002 would be the oldest requisition in the time frame and therefore would be designated as the initial starting point.

Next, in step 121, the TRR resulting from step 118 is used to define a predetermined time window. Thus, if the TRR is ten days, then the predetermined time window is ten days.

In steps 122, 124 and 126, the user commands computer system 14 to process the demand data for the selected item with the predetermined ten day window starting from the initial starting point to determine the total or accumulated demand during that particular predetermined time window. Thus, referring back to FIG. 3, this step would initially evaluate a ten-day window starting at "Jan. 3, 2002" and ending at "Jan. 12, 2002" to determine the accumulated demand during that ten day period. Computer system 14 then stores the accumulated demand for that ten day period for subsequent processing. Next, computer system 14 increments the starting point by one day to provide an updated starting point and evaluates the next ten day window starting from the updated starting point. Therefore, computer system 14 evaluates the ten day period starting from "Jan. 4, 2002" to "Jan. 13, 2002" to determine the accumulated demand during that ten day period. Computer system 14 then stores the accumulated demand for that ten day period to memory. Computer system 14 continues to process the demand data in this manner, continuously incrementing the starting point by one day to provide updated starting points and evaluate the corresponding ten day windows to determine the accumulated demand for each ten day window. This process continues until step 124 determines that the end of the demand data has been reached. Once step 124 determines that the end of demand data has been reached, the method shifts to step 127.

In step 127, computer system 14 processes all stored total or accumulated demand data for each ten day window determined by steps 122, 124 and 126 and then determines the numerically highest accumulated demand. Thus, step 127 yields the numerically highest accumulated demand for all of the ten day windows analyzed in steps 122, 124 and 126. Computer system 14 then displays the determined numerically highest accumulated demand on display device 20.

Figure 6:
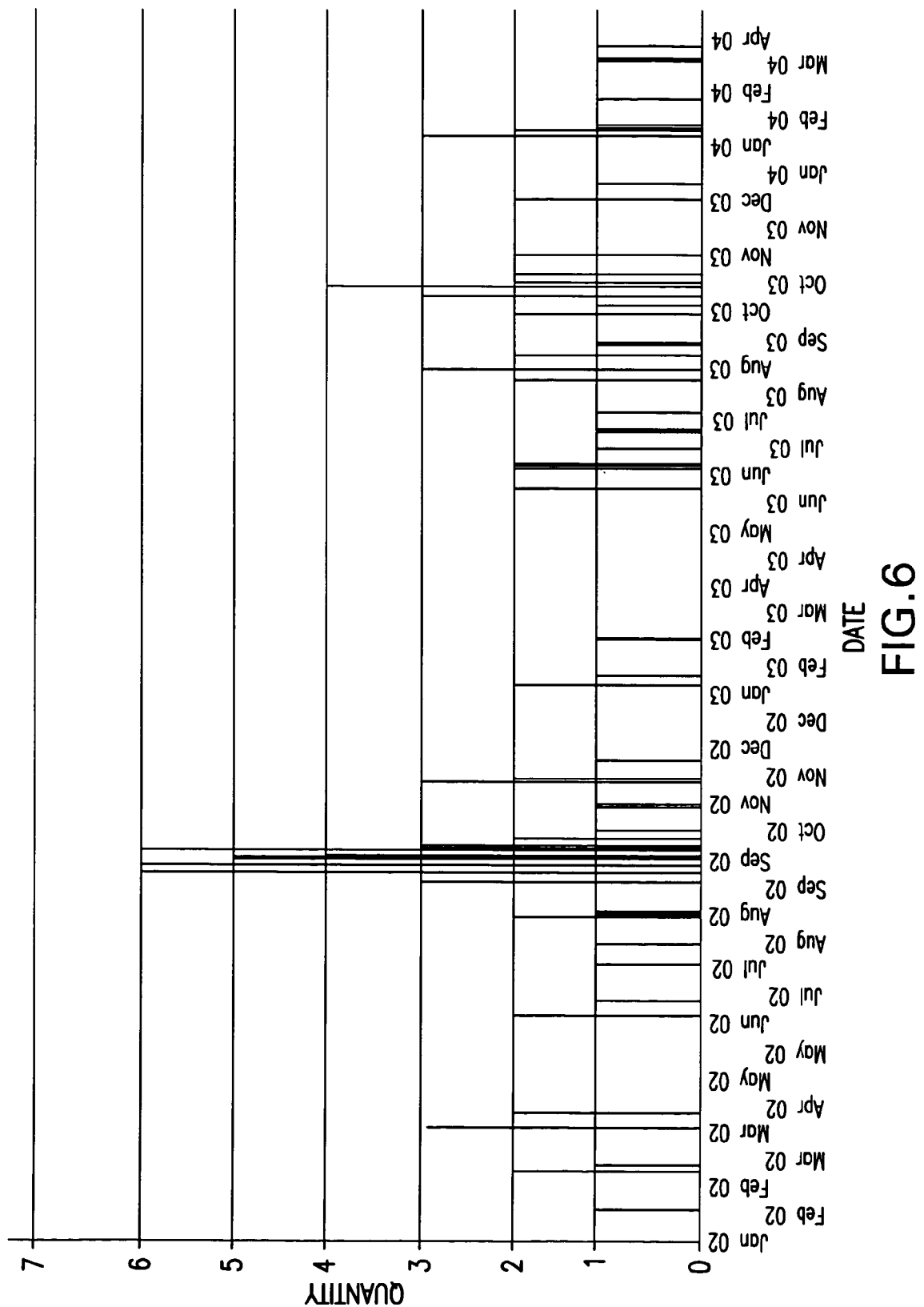
FIG. 6 is an exemplary graph showing accumulated demand corresponding to a particular TRR.

In step 128, computer system 14 graphically generates on display device 20 a graph showing the demand pattern based on the series of accumulated demand values determined in steps 122, 124 and 126, and the corresponding ten-day time windows. For purposes of facilitating understanding of step 128, it is assumed that the optimum TRR is ten days and step 127 has determined that the numerically highest accumulated demand is six. An example of the graph generated by this step is shown in FIG. 6. This graph contains data for a two year period, commencing January 2002, and ending April, 2004. The vertical axis is the ordered quantity of the item and the horizontal axis is the entire time period in question. Each data "bar" or "spike" shows the total accumulated demand for a time window equal to the TRR established in step 118, e.g. 10 days. As shown in FIG. 6, during September, 2002, there were three time windows wherein the accumulated demand totaled six items. The next highest accumulated demand is five and this occurred in a time window in September, 2002. The next highest accumulated demand is four and occurred in a time window in September, 2002 and in a time window in October 2003. The remaining accumulated demands are for three items or less.

In step 129, computer system 14 automatically sets the most conservative buffer size equal to the highest numerically accumulated demand. Thus, this step sets the most conservative buffer size to six with the TRR being ten days.

Figure 7:
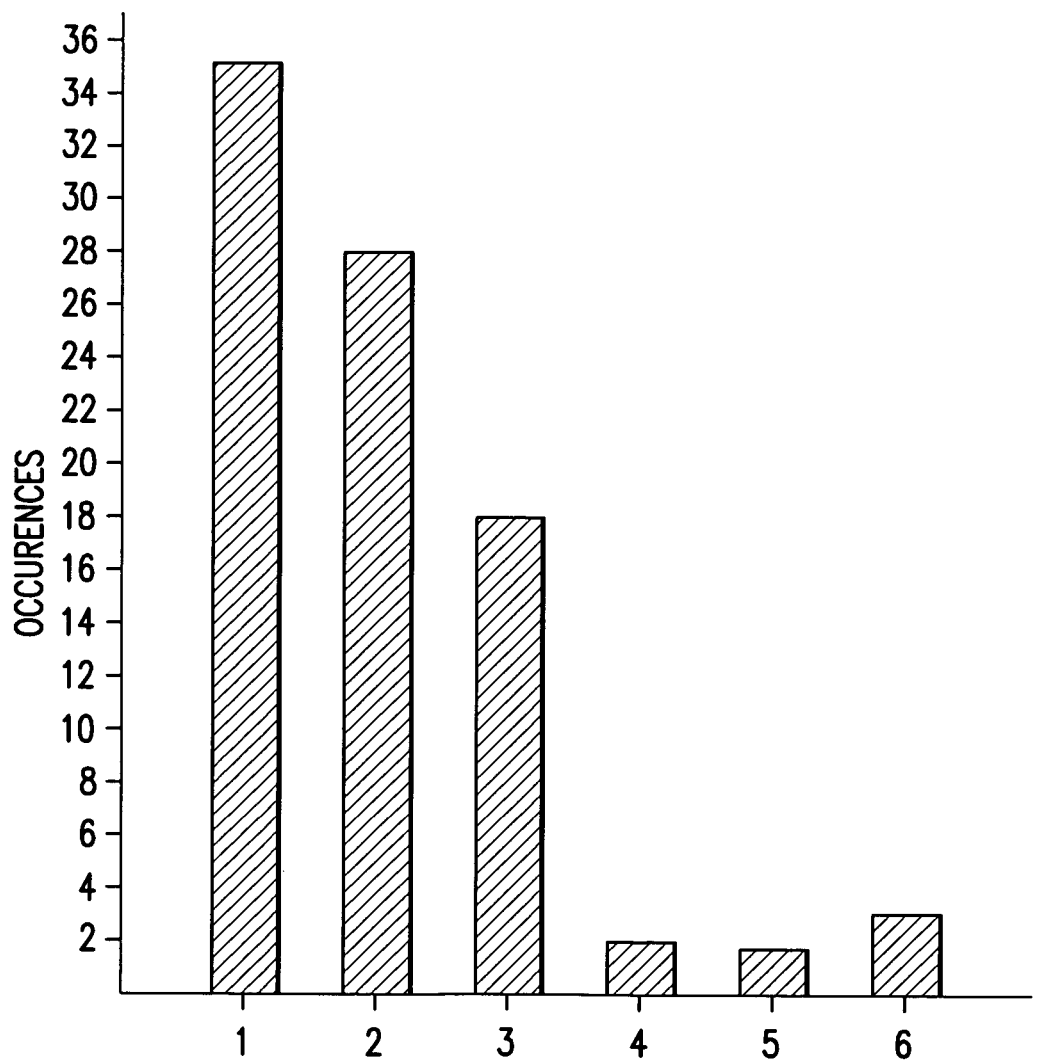
FIG. 7 is an exemplary graph showing the occurrences of particular demand peaks.

In step 130, the user is allowed the opportunity to validate the buffer size established in step 129. Specifically, in this step, the user evaluates the graph shown in FIG. 6 to determine if the established buffer size should remain as is, or if it should be adjusted. In this step, the user also has the option of prompting computer system 14 to generate a graph of "Demand Peak Size" versus "Occurrences" in order to help the user decide whether the buffer size established in step 129 is sufficient, or whether the buffer size should be adjusted. Such a graph is shown in FIG. 7. In this graph, the horizontal axis is "Demand Peak Size" and the vertical axis is "Occurrences". This graph tells the user how many times a demand for a particular quantity of items occurred. For instance, a demand for one item occurred thirty five times. A demand for two items occurred twenty eight times. A demand for three items occurred eighteen times. A demand for four items occurred two times. A demand for five items occurred two times. A demand for six items occurred only three times. Thus, the user may decide that it may not be necessary to maintain a buffer size of six. A relatively high per-item cost in combination with an infrequent demand for six or more items may influence the user into deciding that a buffer size of less than six may be sufficient. However, prior to making an adjustment in the buffer size, it is preferable that the user first analyze what impact a buffer size of six may have on the ability to meet demand for the item throughout a particular period of time. This is further described in step 132.

Figure 8:
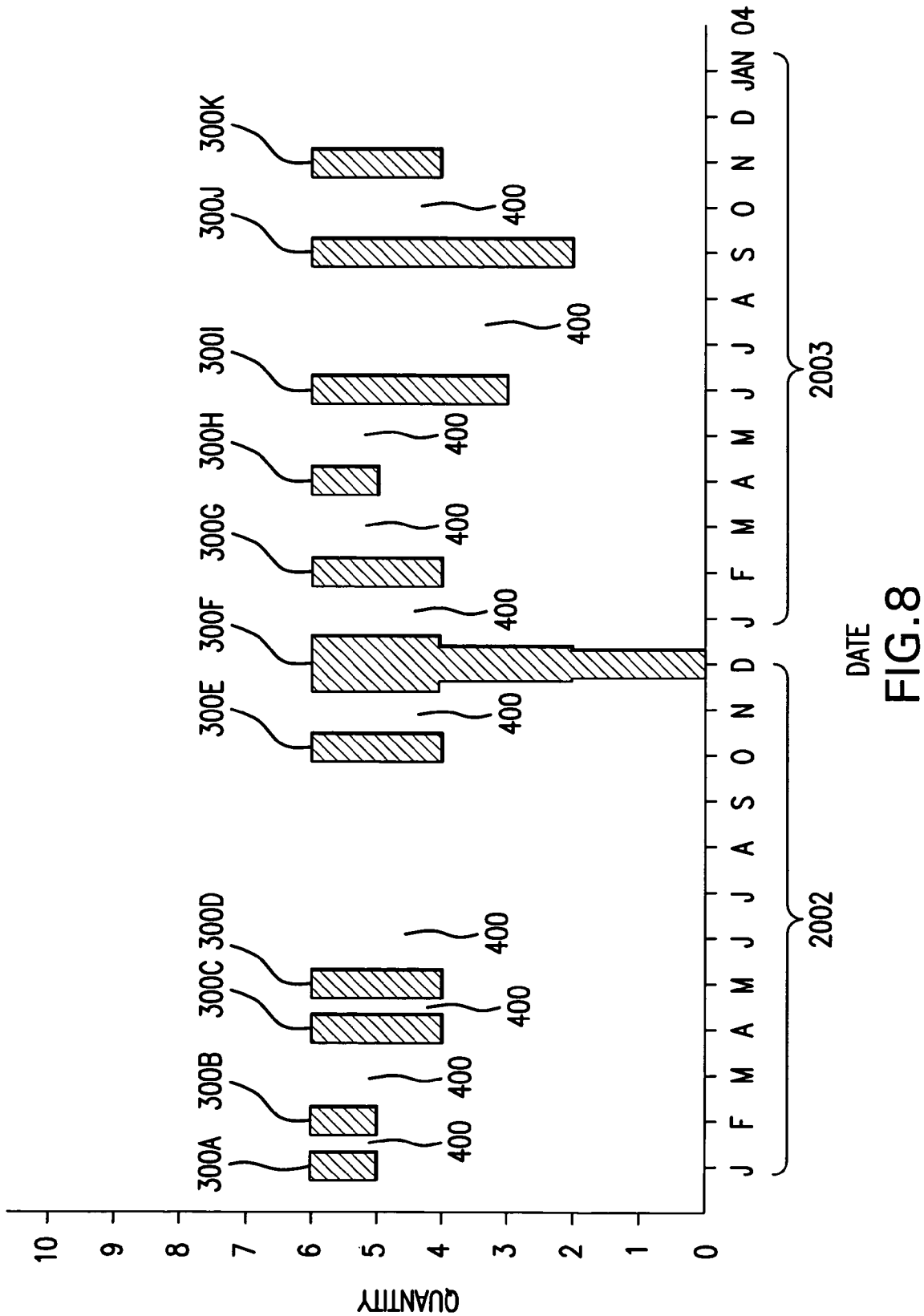
FIG. 8 is an exemplary graph showing the impact of a particular buffer size on the demand and supply activities.

In step 132, the user prompts computer system 14 to generate a graph that illustrates what impact a buffer size of six will have on meeting the demand for the item. Such a graph is shown in FIG. 8. This graph is based on a TRR of ten days and a buffer size of six. The vertical axis represents the number of items in the buffer. The horizontal axis represents a particular time frame. The graph shows "bars", indicated by reference numbers 300A-K, which show depletion of the buffer inventory and the remaining buffer inventory after a period of time (i.e. days) has elapsed. The width of each bar corresponds to the amount of time that has elapsed. For instance, bar 300A indicates the buffer inventory, which originally had six items, was reduced to five items during a period of time in January 2002. The regions or areas between bars 300A-K are indicated by reference number 400 and define the periods of time when the buffer inventory is full, i.e. six items. Bar 300G shows that the buffer, originally having six items, has been reduced to four items during a period of time in February, 2003. Bar 300F shows the buffer inventory has been depleted to zero in December, 2002. Therefore, this graph provides the user with an indication as to whether a buffer size of six is sufficient, too large or too small. In this particular example, the user may decide to decrease the buffer size to four or five since most of the time, the buffer size is not depleted below four items. Thus, the user may decrease the buffer size to four. If the user does adjust the buffer size, step 132 is repeated so the user can view the impact or implications of the new buffer size.

While the present invention has been described in the context of a fully functioning data processing system and method, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disc drive, RAM, and CD-ROMs as well as transmission-type media such as digital and analog communication links.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. A method for determining buffer inventory size comprising:
   (a) providing a computer system comprising a processor, a memory device, an input for receiving data from a data source, and a user interface;
   (b) utilizing the user interface to select an item for which demand data is to be reviewed and select a sample time period for which the demand data is to be reviewed, wherein the selected sample time period has a start date and an end date;
   (c) collecting discrete demand data from a data source that corresponds to the selected item and selected sample time period and inputting the collected discrete demand data into the input of the computer system, wherein the discrete demand data comprises dates of requisitions and the periods of time-to-replenish needed to complete the requisitions;
   (d) processing and analyzing the discrete demand data to identify all periods of time-to-replenish that are non-recurring demand spikes, exceptions, anomalies or which occurred in a relatively early time segment of the selected sample time period, wherein the relatively early time segment is defined by a predetermined segment of time starting from the start date of the selected sample time period;
   (e) utilizing the user interface to input a percentage value that represents a percentage of completed requisitions within the selected sample time period, excluding completed requisitions corresponding to the periods of time-to-replenish identified in step (d);
   (f) utilizing the processor to process the discrete demand data, excluding the periods of time-to-replenish identified in step (d), and the percentage value to determine an optimum Time-To-Reliably Replenish (TRR) that is sufficient to allow completion of the percentage of requisitions;
   (g) utilizing the processor to generate a representation of dispersion of replenishment time TRR for the selected item and indicating in the representation the determined optimum TRR;
   (h) utilizing the processor to process the discrete demand data to determine a date of an oldest requisition for the selected item and designating this determined date of the oldest requisition as an initial starting point;
   (i) utilizing the user interface to define a predetermined time window equal to the determined optimum TRR;
   (j) utilizing the processor to process the discrete demand data within the predetermined time window starting from the initial starting point to determine an accumulated demand for the selected item during that particular predetermined time window;
   (k) storing the accumulated demand determined in step (j) in the memory device;
   (l) incrementing the initial starting point to a date of a next discrete demand to provide an updated starting point;
   (m) utilizing the processor to process the discrete demand data within the predetermined time window starting from the updated starting point to determine an accumulated demand for the selected item during that particular predetermined time window;
   (n) storing the accumulated demand determined in step (m) in the memory device;
   (o) repeating steps (l), (m) and (n) until the end of the discrete demand data has been reached;
   (p) utilizing the processor to process all stored determined accumulated demands to determine a numerically highest accumulated demand;
   (q) utilizing the user interface and processor to generate a time-based demand pattern for the selected item based on the series of determined accumulated demands determined in steps (j)-(o); and
   (r) setting a buffer inventory size equal to the determined numerically highest accumulated demand.

2. A computer-executable program product comprising computer executable instructions tangibly embodied on a non-transitory computer readable medium that when executed by a computer perform the method steps comprising:
   (a) allowing a user to select an item for which demand data is to be reviewed and select a sample time period for which the demand data is to be reviewed, wherein the selected sample time period has a start date and an end date;
   (b) collecting discrete demand data from a data source that corresponds to the selected item and selected sample time period and inputting the collected discrete demand data into the input of the computer system, wherein the discrete demand data comprises dates of requisitions and the periods of time-to-replenish needed to complete the requisitions;
   (c) processing and analyzing the discrete demand data to identify all periods of time-to-replenish that are non-recurring demand spikes, exceptions, anomalies or which occurred in a relatively early time segment of the selected sample time period, wherein the relatively early time segment is defined by a predetermined segment of time starting from the start date of the selected sample time period;
   (d) utilizing the user interface to input a percentage value that represents a percentage of completed requisitions within the selected sample time period, excluding completed requisitions corresponding to the periods of time-to-replenish identified in step (c);
   (e) utilizing the processor to process the discrete demand data, excluding the periods of time-to-replenish identified in step (c), and the percentage value to determine an optimum Time-To-Reliably Replenish (TRR) that is sufficient to allow completion of the percentage of requisitions;

(f) utilizing the processor to generate a representation of dispersion of replenishment time TRR for the selected item and indicating in the representation the determined optimum TRR;
(g) utilizing the processor to process the discrete demand data to determine a date of an oldest requisition for the selected item and designating this determined date of the oldest requisition as an initial starting point;
(h) utilizing the user interface to define a predetermined time window equal to the determined optimum TRR;
(i) utilizing the processor to process the discrete demand data within the predetermined time window starting from the initial starting point to determine an accumulated demand for the selected item during that particular predetermined time window;
(j) storing the accumulated demand determined in step (i) in the memory device;
(k) incrementing the initial starting point to a date of a next discrete demand to provide an updated starting point;
(l) utilizing the processor to process the discrete demand data within the predetermined time window starting from the updated starting point to determine an accumulated demand for the selected item during that particular predetermined time window;
(m) storing the accumulated demand determined in step (l) in the memory device;
(n) repeating steps (k), (l) and (m) until the end of the discrete demand data has been reached;
(o) utilizing the processor to process all stored determined accumulated demands to determine a numerically highest accumulated demand;
(p) utilizing the user interface and processor to generate a time-based demand pattern for the selected item based on the series of determined accumulated demands determined in steps (i)-(n); and
(q) setting a buffer inventory size to have a value equal to the determined numerically highest accumulated demand.

3. A system for determining buffer inventory, comprising:
a computer comprising a processor to execute computer program instructions and process input data, a user interface, a data input to receive data from a data source, a display device, and a memory to store computer program instructions executable by the processor, for performing the steps of:
(a) allowing a user to utilize the user interface to select an item for which demand data is to be reviewed and select a sample time period for which the demand data is to be reviewed, wherein the selected sample time period has a start date and an end date;
(b) collecting discrete demand data from the data source, wherein the collected discrete demand data corresponds to the selected item and selected sample time period and inputting the collected discrete demand data into the data input of the computer system, wherein the discrete demand data comprises dates of requisitions and the periods of time-to-replenish needed to complete the requisitions;
(c) processing and analyzing the discrete demand data to identify all periods of time-to-replenish that are non-recurring demand spikes, exceptions, anomalies or which occurred in a relatively early time segment of the selected sample time period, wherein the relatively early time segment is defined by a predetermined segment of time starting from the start date of the selected sample time period;
(d) allowing a user to use the user interface to input a percentage value that represents a percentage of completed requisitions within the selected sample time period, excluding completed requisitions corresponding to the periods of time-to-replenish identified in step (c);
(e) processing the discrete demand data, excluding the periods of time-to-replenish identified in step (c), and the percentage value to determine an optimum Time-To-Reliably Replenish (TRR) that is sufficient to allow completion of the percentage of requisitions;
(f) generating a representation of dispersion of replenishment time TRR for the selected item, displaying the representation on the display device, and indicating in the representation the determined optimum TRR;
(g) processing the discrete demand data to determine a date of an oldest requisition for the selected item and designating this determined date of the oldest requisition as an initial starting point;
(h) defining a predetermined time window equal to the determined optimum TRR;
(i) processing the discrete demand data within the predetermined time window starting from the initial starting point to determine an accumulated demand for the selected item during that particular predetermined time window;
(j) storing the accumulated demand determined in step (i) in the memory device;
(k) incrementing the initial starting point to a date of a next discrete demand to provide an updated starting point;
(l) processing the discrete demand data within the predetermined time window starting from the updated starting point to determine an accumulated demand for the selected item during that particular predetermined time window;
(m) storing the accumulated demand determined in step (l) in the memory device;
(n) repeating steps (k), (l) and (m) until the end of the discrete demand data has been reached;
(o) processing all stored determined accumulated demands to determine a numerically highest accumulated demand;
(p) generating a time-based demand pattern for the selected item based on the series of determined accumulated demands determined in steps (i)-(n), and displaying the time-based demand pattern on the display device; and
(q) setting a buffer inventory size equal to the determined numerically highest accumulated demand.

* * * * *